United States Patent [19]

Finger

[11] 4,003,407
[45] Jan. 18, 1977

[54] DRIP-PREVENTING CONDENSATION SHROUD USABLE WITH WATER HEATERS

[75] Inventor: John F. Finger, Beresford, S. Dak.
[73] Assignee: Sioux Steam Cleaner Corporation, Beresford, S. Dak.
[22] Filed: Sept. 20, 1974
[21] Appl. No.: 507,921
[52] U.S. Cl. ............................ 138/103; 138/112; 138/113; 138/178; 165/71
[51] Int. Cl.² ........................................ F16L 55/24
[58] Field of Search .......... 138/103, 106, 108, 112, 138/113, 114, 148, 178; 126/361; 165/70, 71; 285/13, 14; 248/54 R

[56] References Cited

UNITED STATES PATENTS

| 192,474 | 6/1877 | Wiestling | 138/148 X |
|---|---|---|---|
| 195,618 | 9/1877 | Levis | 138/148 X |
| 236,077 | 12/1880 | Peirce | 138/114 X |
| 240,497 | 4/1881 | Babcock | 138/148 X |
| 289,744 | 12/1883 | Aldrich | 138/148 X |
| 360,782 | 4/1887 | Ober | 138/114 X |
| 1,737,161 | 11/1929 | Jupp | 138/113 X |
| 2,451,699 | 10/1948 | Twaroski | 248/54 R |
| 2,647,774 | 8/1953 | Newberry | 248/54 R X |
| 2,938,569 | 5/1960 | Goodrich | 138/113 X |
| 3,088,294 | 5/1963 | Smith | 248/54 R X |
| 3,214,994 | 11/1965 | Tolan | 138/148 X |
| 3,509,917 | 5/1970 | Gartner | 138/114 X |
| 3,606,218 | 9/1971 | Enlund et al. | 248/54 R X |
| 3,752,259 | 8/1973 | Weight et al. | 138/148 X |

FOREIGN PATENTS OR APPLICATIONS

| 343,195 | 1/1960 | Switzerland | 138/148 |
|---|---|---|---|
| 14,801 | 9/1902 | United Kingdom | 138/148 |

Primary Examiner—Richard E. Aegerter
Assistant Examiner—James E. Bryant, III
Attorney, Agent, or Firm—Merchant, Gould, Smith, Edell, Welter & Schmidt

[57] ABSTRACT

A condensation reducing shroud assembly positionable around the inlet pipe of a water heater or the like. The assembly consists of a sleeve element which is positioned in a spaced-apart relationship about the portion of the water heater inlet pipe where condensation normally occurs. A spacing element is utilized to hold the sleeve in proper position, preferably by frictional force. By providing such a shroud assembly on the inlet pipe of a water heater, the accumulation and dripping of condensate which results from the temperature differential between the pipe and the heated air within the heater is eliminated or reduced by various thermal and evaporative processes. In an alternative embodiment, means are provided for trapping the condensate which forms and subsequently eliminating it through evaporation or drainage.

2 Claims, 4 Drawing Figures

DRIP-PREVENTING CONDENSATION SHROUD USABLE WITH WATER HEATERS

BACKGROUND OF THE INVENTION

1. Field of the Invention

The present invention relates to apparatus for preventing the formation and dripping of condensate which accumulates on the inlet pipes of liquid heaters such as water heaters.

2. Description of the Prior Art

Heaters of various types have long been used for heating cold water or other liquids which circulate through a conduit system within the heating unit. One of the best known of such heaters is the household water heater of the type which has a generally cylindrical heater jacket enclosing a burner element, for burning a gaseous fuel, and a heating coil which forms part of the conduit system through which the liquid to be heated circulates. The heating coil is usually a helical conduit and is located generally above the burner element such that the heat produced by the burner is adequately transferred to the coil and thus to the water circulating within it. A flue or stack is provided in the top of heater jacket for venting the fumes resulting from the combustion of the gas in the burner element.

The cold water to be heated enters the water heater through a portion of the circulating conduit which is referred to as the inlet pipe. The inlet pipe generally enters the bottom portion of the heater jacket and extends upwardly through the water heater interior where it is joined to the heating coil. The inlet pipe is usually positioned adjacent to the burner and is exposed to the heat coming from the burner. Because the water which is circulated through the water heater is at its coldest temperature at the inlet pipe, there is a relatively large temperature gradient between the water entering the heater through the inlet pipe and the heated air surrounding the inlet pipe adjacent the heater burner. As the circulating water is carried up and through the heating coil, the temperature gradient between the liquid and the surrounding air within the heater is reduced because of the rapid rate at which the water is heated.

The relatively cold temperature of the water as it enters the heater through the inlet pipe and the generally high temperature of the heated air surrounding the inlet pipe causes the exterior surface of the inlet pipe to be at a temperature which is usually below the dew point of the air within the heater. As a result, air-borne liquid contained within the heater jacket condenses out of the air in the form of condensate accumulating on the inlet pipe. Such condensation is generally limited to the inlet pipe where the temperature differential between the water within the pipe and the heated air surrounding the inlet pipe is the greatest. Other portions of the circulatory conduit are not generally affected by condensate because they are usually positioned above the burner element and the strong draft of hot air from the burner tends to vaporize or carry away any condensate which might tend to accumulate on that portion of the circulating conduit.

The presence of condensate on the inlet pipe of a water heater causes problems in several regards. When such condensate drips off of the inlet pipe and onto the area surrounding the water heater, it can accumulate in large quantities over an extended period of time and cause an unsightly condition and possibly damage the surface on which it accumulates. In addition, if there is a significant amount of unburned gaseous fuel emitted from the burner element in the heater, this fuel also condenses on the inlet pipe. Such accumulations of fuel may prove hazardous under certain operating conditions wherein they may ignite.

One of the most serious problems which results from the condensation of airborne liquid on the inlet pipe of a water heater is the corrosion and eventual destruction of the inlet pipe or portions of the water heater upon which the condensation accumulates. Because the inlet pipe and water heater are typically constructed of metal, the continual presence of water or other liquids can cause the oxidation of metal, such as the rusting of steel. In addition to oxidation of metals which can result from the presence of water, other forms of chemical corrosion are encountered when the fuel burned in the water heater produces sulfur dioxide. As is well known, sulfur dioxide usually combines with water to produce sulfurous acid which can be very damaging to various metals. This aggravates and compounds the corrosion problem presented by the mere presence of water. Obviously, the corroding effect of water and sulfurous acid may cause the weakening or total destruction of the inlet pipe or water heater. This would result in replacement or repair of the heater, the inlet pipe or other portions of the circulatory conduit.

Various attempts have been made in the past to reduce this problem of condensation on the inlet pipe of this type of water heater. Generally, these attempts have been directed primarily at the reenforcement of the inlet pipe and the surrounding area. The purpose of such reenforcing is to provide a thicker wall for the conduit where the condensation most frequently accumulates and to thus increase the life of the pipe portions which would normally be corroded away by the presence of condensate. It has also been common in the past to provide drip pans and the like in the base of the heater to accumulate the condensate which runs off of the intake pipe. While such drip pans prevent the condensate from dripping out of the water heater and onto the surrounding area, they do not reduce the presence of the potentially corrosive condensate on the inlet pipe.

SUMMARY OF THE INVENTION

The present invention is a shroud assembly which is positionable around the inlet pipe of a water heater. Its purpose is to eliminate the formation and dripping of condensate which would normally occur on the water heater inlet pipe. Such condensation generally occurs when the temperature of the water entering the heater through the inlet pipe reduces the surface temperature of the pipe below the dew point of the air within the heater jacket.

The shroud assembly consists of a sleeve which is positioned around the inlet pipe with an air space provided between the sleeve and the pipe. Means are provided for attaching the sleeve to the inlet pipe to maintain the spacial relationship and allow the flow of air within the sleeve. It has been found that this apparatus reduces and usually eliminates the presence of condensate on the inlet pipe over which the shroud is positioned.

An alternative embodiment is provided by the present invention wherein the inlet pipe is in a generally vertical position and the sleeve is attached to the inlet pipe by means of a closed spacing element. The sleeve is spaced apart from the surface of the inlet pipe and the spacing element is attached to the sleeve such that the spacing element seals off the space between the sleeve and the pipe. In the event that a large amount of condensate forms on the inlet pipe because of the extreme cold temperature entering the heater, the condensate which does form can be accumulated in the bottom of the shroud assembly and subsequently removed from the shroud assembly by evaporation or drainage. The shroud assembly may be a separate unit which can be attached to the inlet pipe of an existing water heater or it can be manufactured as an integral part of the inlet pipe for subsequent assembly to a water heater, to a steam generator or other water heating devices.

DETAILED DESCRIPTION OF THE PREFERRED EMBODIMENT

Figure 1:
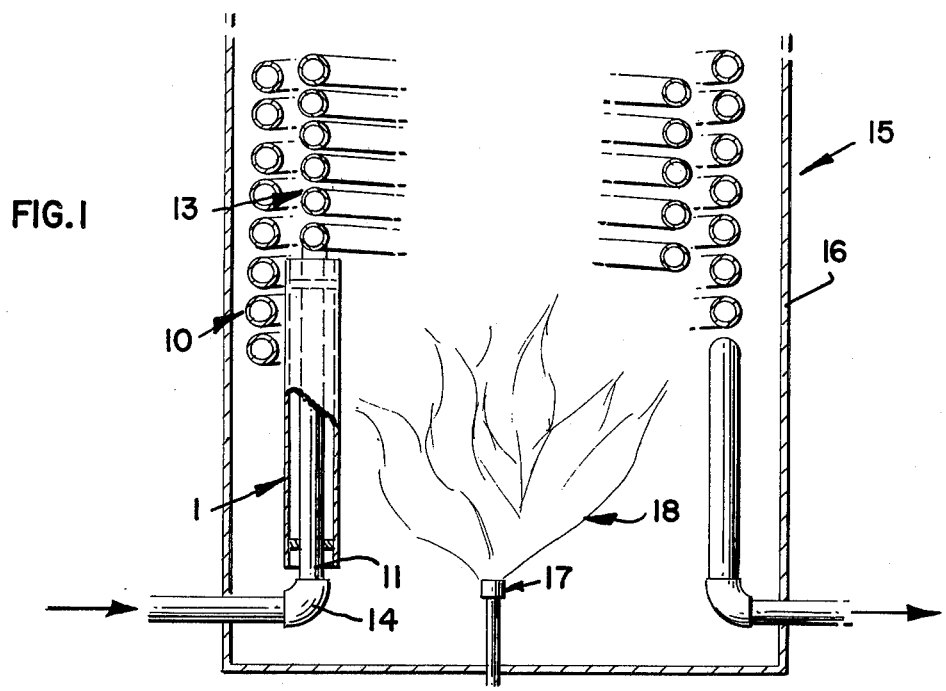
FIG. 1 is a cut-away view of a water heater showing the installation of the shroud assembly.

Referring to FIGS. 1–4, wherein like numerals refer to like structural elements, the present invention is a shroud assembly 1 which is adaptable for use on a heating unit such as a steam or water heater 15. Such a heating unit typically comprises a heater jacket 16 which surrounds a heating coil 13. Heating coil 13 may have a helical shape and forms a portion of a circulatory conduit 10 which carries a liquid such as water into and through the water heater 15. A burner element 17 is located in the base of the heater and burns a gaseous or liquid fuel to heat the area contained within the heater jacket 16. A flue or chimney (not shown) is provided adjacent the heater jacket 16 for purposes of venting combustion products.

Referring specifically to the circulatory conduit 10, in many water heaters it is comprised of two portions. One is the inlet pipe 11 which is generally located within the heater, usually at the base of the heater jacket, and which carries the cold liquid into the heater for subsequent heating. A second portion is a heating coil 13 which is often formed in a helical shape and is positioned generally above the burner 17. It is within the heating coil 13 that the water is heated for subsequent distribution out of the top of water heater 15. The use of a helical heating coil 13 with many convolutions allows the water contained within the conduit to be circulated above the burner element for a considerable amount of time to accomplish the necessary heating. Other forms of heating coils may also be used.

Because the liquid carried in the circulatory conduit 10 is typically at a relatively low temperature when it enters the heater jacket 16 through inlet pipe 11, a relatively large temperature differential exists between the exterior surface of inlet pipe 11 and the air contained within heater jacket 16. This temperature differencial causes the condensation of moisture on the exterior of inlet pipe 11. This results because the surface temperature of inlet pipe 11 is below the dew point of the moisture laden air which surrounds the pipe. Condensation is not as likely to occur on the heating coil 13 because it is located generally above burner 17 and the strong draft of hot air from the burner tends to inhibit the formation of condensate. In addition, the water in the heating coil is warmer and its temperature is generally above the dew point temperature.

Figure 2:
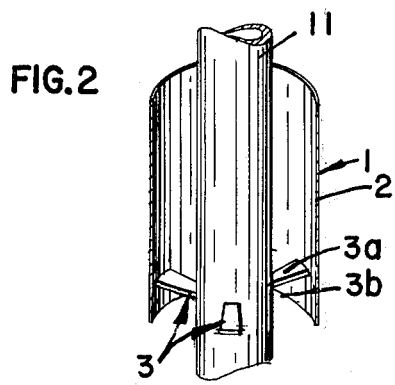
FIG. 2 is a sectional perspective view of the shroud assembly showing a ventilated spacing element.

As is best shown in FIG. 2, shroud assembly 1 comprises a sleeve 2 which surrounds the inlet pipe 11 of water heater 15. While inlet pipe 11 is shown in the Figures as being generally vertical, it may also be oriented in a different, more horizontal position. The sleeve 2 is sized so that an air space is provided between the inlet pipe 11 and the interior surface of sleeve 2. When shroud assembly 1 is placed over the inlet pipe 11, the presence of condensation on the inlet pipe is reduced and usually eliminated. This is the case on both steam generators and water heaters.

The spacial relationship between sleeve 2 and inlet pipe 11 is maintained by spacing means 3 which keep the shroud 1 removed from and generally parallel to the surface of inlet pipe 11. In the embodiment shown in FIG. 2, the spacing means consists of a spacing element 3a which is attached to the sleeve 11. Spacing element 3a contains an opening at its center which is in generally abutting engagement with inlet pipe 11. While the spacing element 3b is shown as a disc-like member in FIG. 2, it may also take other forms which are suitable. Other additional spacing elements may also be provided where the sleeve 2 is generally long and needs additional support (not shown).

The shroud assembly 1 can be used as an integral part of an inlet pipe for a water heater, or as a separate device which is easily attached to existing inlet pipes. When the device is used as an integral part of an inlet pipe (this embodiment not shown in the Figures), the sleeve may be attached to the inlet pipe by welding, the use of a sweat fitting or by the use of threaded parts, or by other means.

Figure 3:
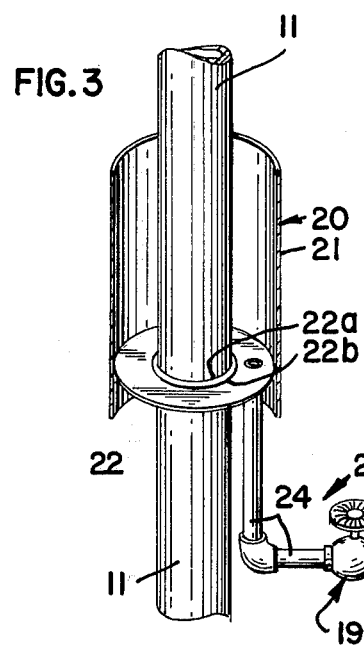
FIG. 3 is a sectional perspective view of a shroud assembly using a solid spacing element with drainage apparatus attached.
Figure 4:
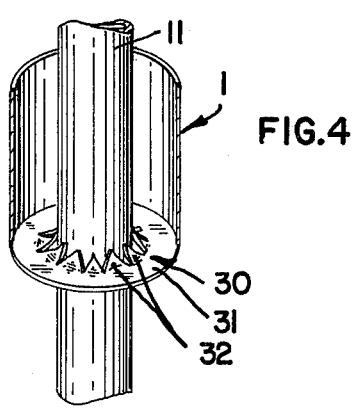
FIG. 4 is a sectional perspective view of a shroud assembly utilizing a friction-fit attachment element.

If the shroud assembly 1 is to be used as a separate device which can be easily attached to existing inlet pipes, two general types of attachment may be utilized. First, various bracket-type attachment means (not shown) may be used wherein sleeve 2 is bolted or otherwise rigidly attached to the inlet pipe 11. Secondly, a method similar to that shown in FIG. 4 may be utilized wherein attachment means 30 comprise a flexible member 31 attached to sleeve 2 and extending between sleeve 2 and inlet pipe 11; member 31 abuts pipe 11 so as to form a frictional fit to hold the shroud assembly 1 in place on pipe 11. In particular, FIG. 4 shows a flexible member 31 formed of thin metal which has been cut into a star-like design to form a collar which fits around the inlet pipe 11. The protuberances 32 on the flexible member 31 are elastically deformed when the shroud assembly 1 is positioned over inlet pipe 11 thereby exerting a force upon the inlet pipe to hold the assembly in place. This allows the shroud assembly 1 to be retained in any desired position on inlet pipe 11. Another embodiment of the present invention utilizing a friction-type attachment means is shown in FIG. 3. In that embodiment a rubber-like flexible ring 22b is attached to spacing element 22. Flexible element 22b has an opening 22a which is slightly smaller than the outside diameter of inlet pipe 11 such that it forms a friction fit when the shroud assembly 1 is positioned over the pipe. Other friction-type devices may also be utilized in combination with the spacing elements to provide abutting engagement between the shroud assembly 1 nd inlet pipe 11. In the embodiments shown in FIGS. 3 and 4, the attachment means are an integral part of the spacing means. Such combination of functions in a single element provide simplicity of design and makes the construction of the element more economical.

It has been found that two general types of spacing means may be used for positioning a sleeve 2 on inlet pipe 11. The first utilizes a ventilated spacing element such as element 3b shown in FIG. 2. The second utilizes a closed spacing element such as element 22 depicted in FIG. 3. When the spacing element is ventilated, as with element 3b, air is allowed to pass freely between the inlet pipe 11 and sleeve 2. It is now known what the exact nature of the phenomenon is, but it is found when this spacing relationship is utilized to produce a free flow of air around the inlet pipe, practically no condensate forms on the inlet pipe. With reference to the use of closed spacing elements, it has beeen found that when sleeve 2 is positioned on inlet pipe 11 with a closed spacing element 22 such as shown in FIG. 3, the condensation which accumulates on inlet pipe 11 is significantly reduced and often eliminated. One embodiment of a closed spacing element is shown in FIG. 3 wherein element 22 extends between sleeve 2 and inlet pipe 11. In the particular embodiment shown in FIG. 3, a rubber ring 22b is an integral part of spacing element 22 and provides a friction fit between the shroud assembly 1 and inlet pipe 11 to position the shroud in a desired location as described above. This produces a sealed barrier between the sleeve 21 and the inlet pipe 11.

When a closed spacing element is utilized to seal the space between the sleeve and the inlet pipe, such as is shown in FIG. 3, condensate may not form at all, or, when it does, it is accumulated in the enclosure formed by the sleeve 21 and spacing element 22. The entrapped condensate may either evaporate due to the presence of heat radiated from burner 17 or it can be drained from the enclosure. Where it is desired to drain off the condensate accumulated in the shroud assembly 20 of FIG. 3, a drain assembly 23 or similar device may be utilized. In a particular embodiment shown in FIG. 3, a drain valve 19 having an outlet spout 26 is provided for controlled removal of the condensate from the shroud assembly 20. The use of a drain assembly for removing the accumulated condensation from the shroud assembly 20 is particularly beneficial where the water entering the heater is particularly cold or where there is a large amount of moisture in the air such that a large amount of condensation tends to accumulate despite the beneficial drying effects of the shroud assembly. It is then desirable that such large amounts of condensate be drained from the shroud assembly 20 rather than merely allowing them to accumulate for eventual evaporation.

It has been found that various materials may be utilized for constructing the shroud assembly. Thin metal is particularly desirable, such as aluminum, but it is conceivable that other heat resistant materials may also be utilized. Similarly, various materials may be used to provide the friction fit between the spacing element and the shroud sleeve.

The functioning of this invention can be briefly described as follows. Water heaters which use a circulating conduit 10 to circulate water through a heated jacket 16 often have condensate accumulate on the burner inlet pipe 11. To reduce the formation of this condensate, shroud assembly 1 is utilized to partially enclose inlet pipe 11.

Shroud assembly 1 comprises a sleeve 11 which is positioned in spaced relationship around the inlet pipe 1. This spaced relationship is maintained by a spacing element which surrounds the inlet pipe to hold the sleeve in a generally concentric orientation around the inlet pipe. The spacing element which is provided may be either ventilated, wherein the entire amount of condensate which would normally occur is eliminated, or it may be a closed element. When a closed element is utilized, condensate may still continue to accumulate at a reduced rate. In such case, the spacing element prevents the condensate from dripping off of the inlet pipe onto the area beneath the water heater. If the condensate accumulating in the shroud assembly does not totally evaporate, a drain assembly may be attached to the spacing element and the condenste drained off by that means.

It should be noted that this invention is particularly useful in combination with a steam generating heater. In such an instance, the heating coil may have a different configuration than that shown in FIG. 1, but this will not effect the operation of the invention. Steam generating heaters are frequently used for instantaneous heaters and steam cleaners. Also, various combination type heaters may be used. In various designs of steam generators or water heaters the burner, coil and heating jacket may have a different form or orientation than that shown in the drawings. For instance, the heater may have a generally horizontal orientation or the burner may be of the forcedair type. The present invention may be utilized on any such type of steam generator or water heater.

What is claimed is:

1. In an improved heating apparatus of the type having a heating element, and an inlet pipe which is oriented in a generally vertical position and which carries water into an area of the apparatus near the heating element, the improvement comprising a shroud assembly positioned around the inlet pipe, the shroud assembly including:
   a. a sleeve surrounding the inlet pipe;
   b. attachment means for securing said sleeve to the inlet pipe in a generally vertical orientation, said attachment means including a resilient gripping element supported by said sleeve and forcibly abutting the inlet pipe to hold said sleeve thereon by frictional force between said gripping element and the inlet pipe;
   c. spacing means attached to said attachment means for positioning said sleeve about the inlet pipe with said sleeve being spaced apart from the inlet pipe; and
   d. a selectively controllable drain valve attached to said spacing means for draining from said spacing means any accumulated condensate which may form within said sleeve, said drain valve being controllably movable from a closed to an open position to allow the flow of condensate from an area within said sleeve.

2. A shroud assembly positionable around the inlet pipe of a water heater to retard the formation and dripping of condensate on the inlet pipe, comprising:
   a. A sleeve positionable around an inlet pipe;
   b. attachment means for securing said sleeve to an inlet pipe, said attachment means including a resilient gripping element supported by said sleeve and forcibly abutable against an inlet pipe which may be inserted within said sleeve to hold said sleeve to an inlet pipe by frictional force;

c. spacing means for positioning said sleeve in a generally vertical orientation about an inlet pipe to allow for the free convection of air between said sleeve and an inlet pipe which may be positioned within the sleeve;

d. said spacing means containing an opening to allow for the free convection of air between said sleeve and an inlet pipe about which said sleeve may be positioned; and e. a selectively controllable drain valve attached to said spacing means for draining from said spacing means any accumulated condensate which may form within said sleeve, said drain valve being controllably movable from a closed to an open position.

* * * * *

UNITED STATES PATENT OFFICE
CERTIFICATE OF CORRECTION

Patent No. 4,003,407     Dated January 18, 1977

Inventor(s) John F. Finger

It is certified that error appears in the above-identified patent and that said Letters Patent are hereby corrected as shown below:

Column 5, line 1, "nd" should read -- and --.

Column 5, line 14, "now" should read -- not --.

Column 4, line 26, the numeral "3b" should read -- 3a --.

Column 5, line 10 and line 13, the numeral "3b" should read -- 3a --.

Signed and Sealed this twelfth Day of July 1977

[SEAL]

Attest:

RUTH C. MASON
Attesting Officer

C. MARSHALL DANN
Commissioner of Patents and Trademarks